Figure 1:
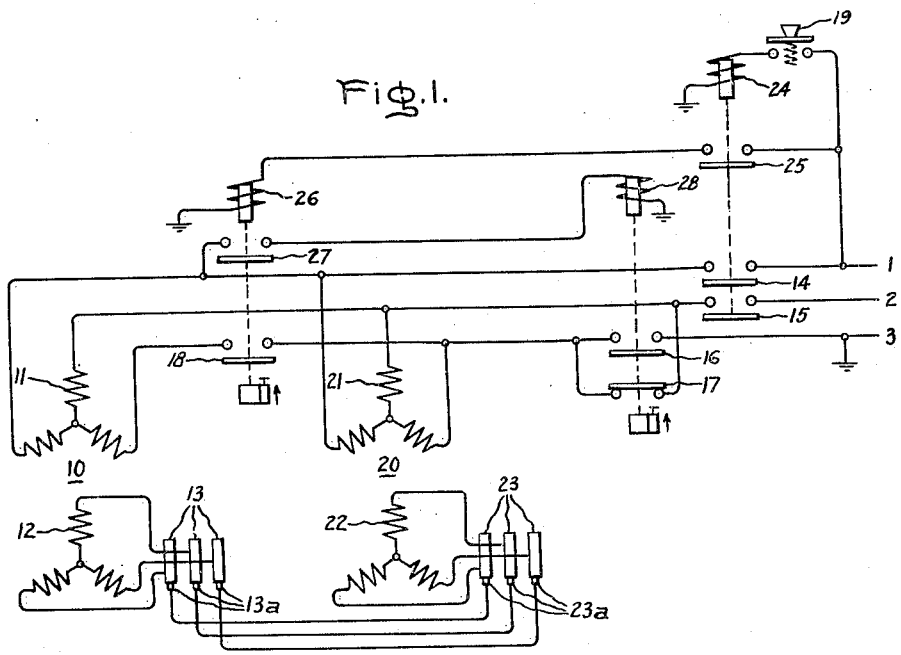

Inventor:
Shafi-Uddin Ahmed Choudhury,
by
His Attorney.

Patented Dec. 27, 1949

2,492,734

UNITED STATES PATENT OFFICE 2,492,734

DYNAMOELECTRIC MACHINE CONNECTION

Shafi-uddin Ahmed Choudhury, Rugby, England, assignor to General Electric Company, a corporation of New York Application March 26, 1949, Serial No. 83,654
In Great Britain December 12, 1947

6 Claims. (Cl. 318—24)

My invention relates to dynamoelectric machine connections and more particularly to systems employing a plurality of alternating current dynamoelectric machines having both their primary windings arranged in parallel and their secondary windings arranged in parallel.

Machines of this type, sometimes known as Selsyns, have polyphase winding on both stator and rotor and either the stator windings or the rotor windings of the two machines are adapted to be connected to a common alternating current supply system. The windings which are not connected to the supply system are interconnected with one another so that the currents in the interconnected winding of one machine circulate through the corresponding winding of the other machine to produce synchronizing torque which holds the two machines in mutual synchronism. Although two machines are mentioned herein, it will be understood by those skilled in the art that the same operation is applicable to a plurality of machines greater than two.

When the machines are applied as Selsyns, one of the machines is driven by a separate motor (or by hand) and the other machine follows the movement of the driven machine. In other systems, both the machines run as induction motors on a common secondary resistance (or other form of impedance) which produces the necessary motoring torque.

Heretofore, it has been found that such machines will not operate in synchronism during the running condition unless the machines lock in synchronism at standstill, rather than with relative angular displacement of substantially 180 electrical degrees.

It is an object of the present invention to provide simple means adapted to overcome the above-mentioned difficulty.

It is a further object of the present invention to provide (for either a system of Selsyn machines or a system employing a plurality of wound rotor induction motors having paralleled primary windings and paralleled secondary windings) means for preventing locking at standstill with relative angular displacement of substantially 180 electrical degrees.

Broadly the means employed in the embodiments herein illustrated and described comprises a switching mechanism which results in providing two alternative positions of field flux (in at least one of such machines) such that if there is an angular displacement at standstill of 180 electrical degrees between the fields of the machines in one position, this will be altered in any alternative position of the machines which will then synchronize at the new position. Thus there will always be enough torque in one position or the other to synchronize the two machines.

Figure 2:
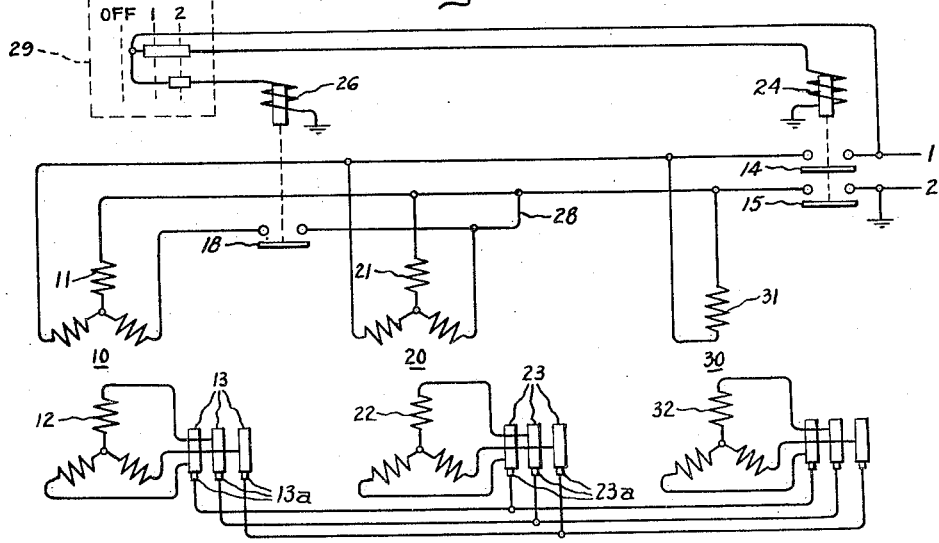

A further understanding of the invention together with additional objects and advantages will become apparent from consideration of the following description taken in connection with the accompanying drawing in which Fig. 1 illustrates the invention as applied to three-phase machines on a three-phase supply, and Fig. 2 represents the invention as applied to three-phase machines on a single-phase supply.

Referring now to Fig. 1, I have diagrammatically illustrated a dynamoelectric machine 10 provided with a three-phase stator winding 11 and a three-phase wound rotor winding 12 connected to the slip rings 13. A second dynamoelectric machine 20 is shown provided with a three-phase stator winding 21 and a three-phase wound rotor winding 22 connected to the slip rings 23. The two rotor windings are short circuited upon each other through brushes 13a and brushes 23a contacting the slip rings of the respective machines.

While the invention herein described would work equally well for similar machines whether they were both delta connected or both Y connected, for the purpose of illustration it is assumed that all machines are Y connected and a three-phase source of electrical power is adapted to be supplied to the two machines of Fig. 1 from the lines 1, 2 and 3 through relay contacts 14—18 as follows: Contacts 14 and 15 are normally open in the deenergized position and close to connect lines 1 and 2 to two of the phases of each stator winding 11 and 21; a normally closed contact 17 connects the third phase of winding 21 (machine 20) back to one of the two excited phases to form what is known in the art as a quadrature shorted connection, contact 18 is normally open in the deenergized position to prevent machine 11 from receiving the quadrature short similar to that of winding 21. It is assumed that the two machines are wound similarly, so that the positions of the stator field axes will now be different in the two machines and these will be 30 electrical degrees apart. If the rotor induced fields are not at the moment 180 degrees apart, the machines will synchronize in this connection. If, however, they are 180 degrees apart the two machines will not synchronize in this connection and the contact 18 is then closed to apply the quadrature shorted connection to the winding 11 of machine 10 so that the same excitation is supplied to both machines. This closing of contact 18 will shift the stator field of machine 10 by 30 degrees and the rotor induced fields will then be 150 degrees apart and the machines will develop enough torque to synchronize. As a final step, contact 17 is opened and contact 16 closed to provide three-phase excitation to both machines. It will be apparent to those skilled in the art that the desired sequence of operation is first to close contacts 14 and 15, then close contact 18 after a fraction of a second delay (this will make no difference if the machines have already synchronized in the first connection), and finally (after another three or four seconds) close contact 16 and open contact 17. Such an arrangement is provided as shown in the drawing by connection from one of the phase wires through an operating push button 19 to energize relay coil 24 thereby to close contacts 14 and 15 as well as a control contact 25 used to energize relay coil 26 which after an appropriate time delay, such as that furnished by a dash pot, operates the associated relay to close contact 18 as well as a control contact 27 which energizes relay coil 28 to, after an additional time delay, open contact 17 and close contact 16.

Referring to Fig. 2, in which items identical to those of Fig. 1 have been like numbered, dynamoelectric machines 10 and 20 are shown connected through contacts 14 and 15 to the single-phase supply provided by lines 1 and 2. In Fig. 2 the primary winding 21 of machine 20 has a permanent quadrature shorted connection through the wire 28 and a third machine 30 is provided. This third machine has a single-phase primary winding 31 and a three-phase slip ring connected rotor winding 32 similar to the rotor winding provided on the other two machines and connected in parallel therewith. Single-phase excitation is applied to the stator windings of all three machines by closing contacts 14 and 15 through energization of the relay coil 24. After a short time delay, contact 18 is closed through energization of relay coil 26 to thereby provide two alternative field positions for winding 11 and thereby synchronize all three machines in one position or the other. If desired, relay coils 24 and 25 may be energized from a drum type hand-operated master switch 29 arranged in conventional manner to assure that there will be some time delay before advancing to the second operating position.

One advantage in application of the invention as illustrated in Fig. 2 is that there are no current-carrying circuits interrupted except after the machines are synchronized. However, even with the embodiment of Fig. 1 any unbalance of secondary voltages (before contact 18 is closed) will be only slight and the circulating current caused thereby will be small both in magnitude and duration.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A plurality of dynamoelectric machines, each machine having a polyphase stator winding and each machine having a polyphase rotor winding with associated slip rings and brushes, means for paralleling the rotor windings of said machines through their respective brushes, means for substantially directly energizing at least one of the phases of each of said stator windings, means for placing an additional phase of one of said stator windings in shorted quadrature relation to the remainder of said winding, and switching means adapted to selectively place a corresponding additional phase of the other of said stator windings in or out of shorted quadrature connection, whereby said machines are adapted to be synchronized in one or the other of the selective positions of said switching means.

2. In combination a pair of dynamoelectric machines each having a three-phase stator winding and a three-phase rotor winding connected to slip rings, brushes contacting said slip rings, paralleling connections from the brushes of one of said machines to the brushes of the other of said machines for shorting said rotor windings one upon the other, means for energizing two of the phases of each of said stator windings, means for energizing the third phase of the stator winding of one of said machines in shorted quadrature upon initial operation of said first-mentioned energizing means, means for energizing the third phase of the stator winding of the other of said machines in shorted quadrature upon a predetermined time delay after the operation of said first energizing means, and means for energizing all of the phases of the stator windings of both of said machines in normal three-phase relationship a predetermined time interval after the operation of said last-mentioned shorted quadrature energizing means.

3. In combination a plurality of dynamoelectric machines each having a polyphase stator winding and a polyphase rotor winding connected through slip rings and slip ring brushes to a short-circuit connection common to the brushes of all of said machines, means for energizing the stator windings of each of said machines in a predetermined phase relationship, and means for selectively altering the phase relationship of stator energization of one of said machines with respect to that existing in at least one other of said plurality.

4. Synchronizing mechanism for a plurality of alternating current dynamoelectric machines having plural phase windings, said mechanism comprising a switch adapted when closed to apply single-phase excitation to all but one of the phase windings of each of said machines and a second switch adapted when in normal starting position to connect said additional phase winding of one of said machines to a supply conductor to form a quadrature shorted connection thereby to cause said machines to synchronize if their induced fields are not 180 electrical degrees apart.

5. Synchronizing mechanism for a plurality of alternating current machines having plural phase windings, said mechanism comprising a switch adapted when closed to apply single-phase excitation to at least one of the phase windings of each of said machines, a second switch adapted when in normal starting position to connect an additional phase winding of one of said machines to one side of said single phase supply to form a quadrature shorted connection, and a third switch adapted to close to complete a quadrature shorted connection to an additional phase winding in another of said machines thereby to alter the angle of the induced field of said second-mentioned machine with respect to that of said first mentioned machine, thereby causing said machines to always synchronize either upon operation of said second-mentioned switch or upon operation of said third-mentioned switch.

6. The method of synchronizing a plurality of alternating current machines comprising providing constant excitation to one of said machines and providing two alternative positions of field flux for the other of said machines, whereby if there is an angular displacement at standstill of 180 electrical degrees between fields of said machines in one position of said second machine field flux, this will be altered in the new position of said second machine field flux and the machines will synchronize in the new position.

SHAFI-UDDIN AHMED CHOUDHURY.

REFERENCES CITED

The following references are of record in the file of this patent:

UNITED STATES PATENTS

| Number | Name | Date |
|---|---|---|
| 2,074,129 | Nowacki | Mar. 16, 1937 |